(12) United States Patent
Hall et al.

(10) Patent No.: US 10,086,515 B2
(45) Date of Patent: Oct. 2, 2018

(54) IN-PROCESS CALIBRATION SYSTEM FOR ROBOT MOVING IN ONE OR MORE AXES

(71) Applicants: David R. Hall, Provo, UT (US); Andrew Priddis, Mapleton, UT (US); Joseph Blanch, Provo, UT (US)

(72) Inventors: David R. Hall, Provo, UT (US); Andrew Priddis, Mapleton, UT (US); Joseph Blanch, Provo, UT (US)

(*) Notice: Subject to any disclaimer, the term of this patent is extended or adjusted under 35 U.S.C. 154(b) by 150 days.

(21) Appl. No.: 15/350,628

(22) Filed: Nov. 14, 2016

(65) Prior Publication Data
US 2018/0133898 A1 May 17, 2018

(51) Int. Cl.
 *B25J 9/16* (2006.01)
 *B25J 13/08* (2006.01)

(52) U.S. Cl.
 CPC ........... *B25J 9/1692* (2013.01); *B25J 13/088* (2013.01); *G05B 2219/39024* (2013.01); *G05B 2219/39049* (2013.01)

(58) Field of Classification Search
CPC ...... B25J 9/1692; B25J 13/088; B25J 9/1694; B25J 9/1697; B25J 9/1674; B25J 9/1676; B25J 9/1669; B25J 9/1682; B25J 19/02–19/04; G05B 2219/39049; G05B 2219/39024; G05B 2219/39033; G05B 2219/39051
See application file for complete search history.

(56) References Cited

U.S. PATENT DOCUMENTS

| | | | |
|---|---|---|---|
| 6,648,730 B1* | 11/2003 | Chokshi | B24B 37/345 250/206.1 |
| 9,108,360 B2* | 8/2015 | Comb | F16H 19/06 |
| 2016/0145054 A1* | 5/2016 | Magnusson | B65G 47/71 198/358 |

* cited by examiner

*Primary Examiner* — Adam R Mott

(57) ABSTRACT

The invention is an in-process calibration system. It is not an open loop system or a closed loop system, but a hybrid system that retains both the low propensity for error of the closed loop system and the simplicity of the open loop system. The invention comprises a housing, one or more robots that move in up to three axes mounted to the housing, at least one sensor for each axis of the robots' movement, and a microcontroller. The sensors are fixed to the housing at known locations, and the microcontroller instructs end effectors of the robots through a sequence of moves that intermittently trigger the sensors. When the sensors are triggered, the microcontroller corrects the idealized location of the end effectors in the microcontroller's calculations to the actual location of the end effectors, which is, at the moment that the sensors are triggered, the known location of the sensors.

15 Claims, 11 Drawing Sheets

IN-PROCESS CALIBRATION SYSTEM FOR ROBOT MOVING IN ONE OR MORE AXES

CROSS-REFERENCES

Technical Field

This invention relates generally to the field of robotics, and more specifically to calibration for robots.

Background

Automation has greatly improved many aspects of everyday life. Consequently, many tasks that were once performed by manual labor are now performed by robots. One benefit of using robots is that robots are capable of carrying out complicated tasks without the need for constant monitoring, because robots have controllers that instruct the robots how and when to move. However, the instructions provided by the controller are often based on theoretical locations of the robot's end effector, the part of the robot that interfaces with other objects. Therefore, one challenge with using robots is the possibility of a discrepancy between the end effector's theoretical location and its actual location.

A system in which there is nothing verifying the actual position of the end effector is called an open system. Open systems work well as long as the theoretical and actual positions of the end effector stay consistent. However, any deviation has the potential to cause problems, especially when accuracy is important. Therefore, many robots are continually calibrated after an initial homing sequence to determine the actual location of the end effector and correct its theoretical location to match its actual location. In cases where accuracy is important, sensors are often used to provide continuous feedback of the location of the end effector, continuously updating the theoretical location with the actual location. This type of system is called a closed loop system.

Closed loop systems are less error prone than open loop systems because of this continual feedback, which detects and corrects errors early instead of allowing them to compound. Closed loop systems are, however, often more complex. Some closed loop systems place a sensor on the end effector that senses the end effector's location as it moves. This "on-board" sensor often requires a wired power supply. Because the end effector, and therefore the sensor, is moving, it is difficult to keep the wired supply from becoming twisted, tangled, or otherwise damaged during normal operations of the robot. Other closed loop systems locate the sensor on the robot actuator. For example, some stepper motors have a sensor located on the motor itself to verify that the amount of rotations of the motor matches the instructions. One problem that still exists with this method is the potential for a discrepancy due to an unexpected interaction in the parts connecting the actuator to the end effector. For example, the stepper motor could be used to drive a belt that moves the end effector up and down. If the belt were to slip, the sensor would verify that the motor turned the correct amount, but the end effector would not have moved as anticipated and the theoretical position would be inaccurate.

In light of the forgoing, what is needed is a hybrid calibration system, not an open loop, but not a closed loop, where sensors are located in a fixed position and will be triggered only occasionally. In other words, what is needed is a simplified system that provides enough feedback to maintain positional accuracy of the end effector while eliminating the need for complex features, such as "on board" sensors or cumbersome wiring.

SUMMARY OF THE INVENTION

The disclosed invention has been developed in response to the present state of the art and, in particular, in response to the problems and needs in the art that have not yet been fully solved by currently available components and methods. Accordingly, efficient structural components and methods have been developed to allow a hybrid calibration system with sensors in a fixed position.

Consistent with the foregoing, an in-process calibration system is disclosed. The in-process calibration system comprises a housing comprising one or more walls, and one or more robots movably mounted to the housing. Each robot moves in up to three axes and comprises one or more end effectors. The in-process calibration system also comprises at least one sensor for each of the up to three axes of the one or more robots' movement. Each sensor is fixed to the housing at a known location in an axis perpendicular to the axis of the one or more robot's movement. In addition, the in-process calibration system comprises a microcontroller that instructs the one or more end effectors in a sequence of moves to one or more idealized locations within the housing, whereby the one or more end effectors intermittently trigger the sensors. The microcontroller is in communication with the sensors such that when the one or more end effectors trigger the sensors, the microcontroller corrects the idealized location of the one or more end effectors to the known location of the sensors.

In certain embodiments, the sensors comprise photoelectric sensors, preferably laser transmitters and receivers, magnetic field sensors, or switches. The one or more robots move in two axes or three axes in some embodiments. Preferably, the one or more robots are H-bots. In some embodiments, the system comprises a user interface, preferably a voice control user interface. In some embodiments, the sequence of moves is part of performing a separate high-level command, such as lifting, suspending, or repositioning an object within the housing. In some embodiments, the in-process calibration system is a component of an automated storage and retrieval system, which may comprise a non-revolving automated storage and retrieval system. The storage and retrieval system may comprise one or more positionable objects, which may be storage bins or appliances, and it may comprise electrically conductive wall hooks.

BRIEF DESCRIPTION OF THE DRAWINGS

A more particular description of the invention briefly described above is made below by reference to specific embodiments depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

Figure 1:
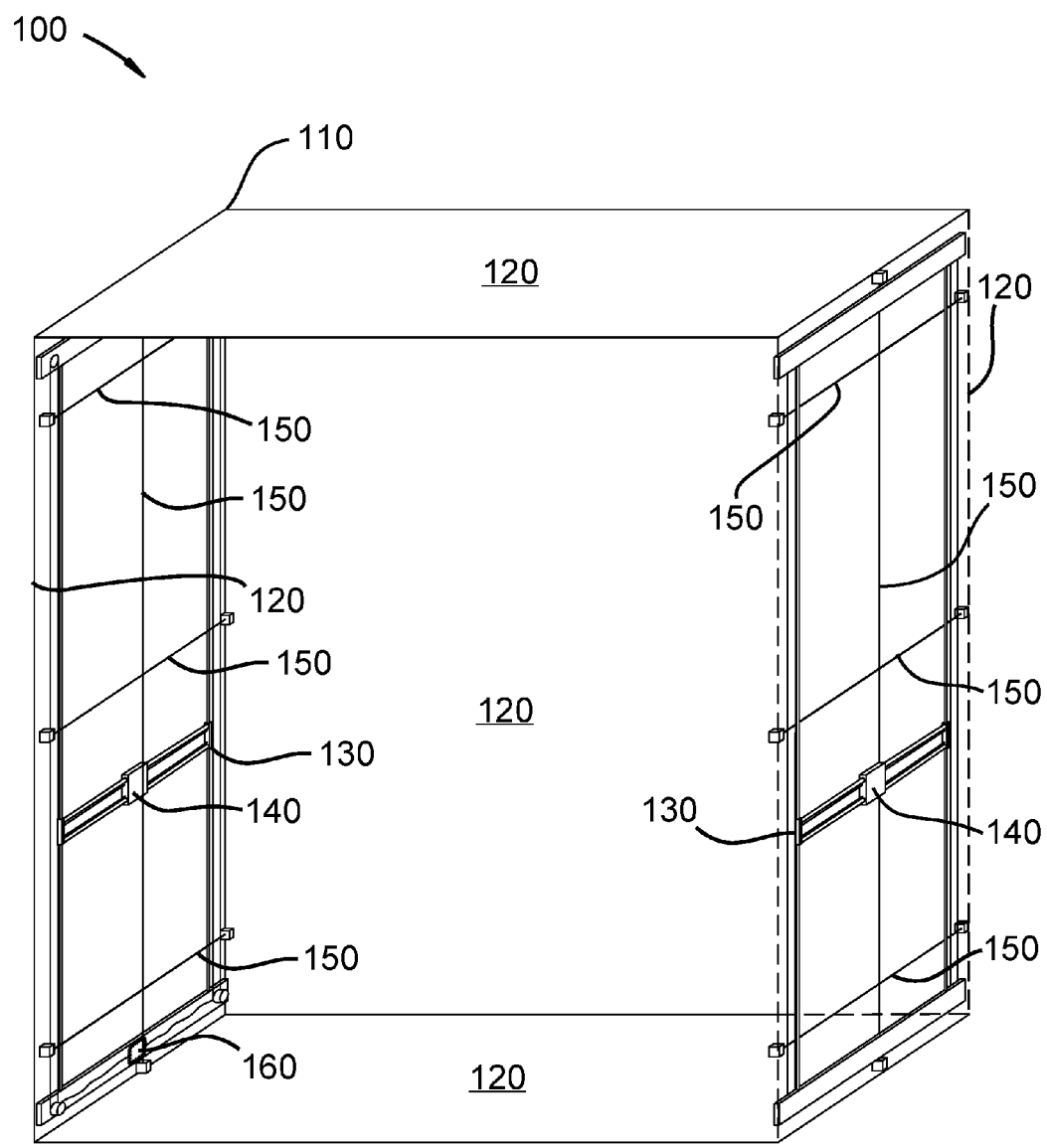
FIG. 1 depicts one embodiment of an in-process calibration system.

FIG. 1 depicts one embodiment of an in-process calibration system 100. The in-process calibration system 100 comprises a housing 110 comprising one or more walls 120. The in-process calibration system 100 also comprises one or more robots 130 movably mounted to the housing 110. Each robot 130 moves in up to three axes and comprises one or more end effectors 140. The in-process calibration system 100 also comprises at least one sensor 150 for each of the up to three axes of the one or more robots' movement. Each sensor 150 is fixed to the housing 110 at a known location in an axis perpendicular to the axis of the one or more robot's movement. The in-process calibration system 100 further comprises a microcontroller 160 that instructs the one or more end effectors 140 in a sequence of moves to one or more idealized locations within the housing 110, whereby the one or more end effectors 140 intermittently trigger the sensors 150. The microcontroller 160 is in communication with the sensors 150 such that when the one or more end effectors 140 trigger the sensors 150, the microcontroller 160 corrects the idealized location of the one or more end effectors 140 to the known location of the sensors 150.

Figure 2A:
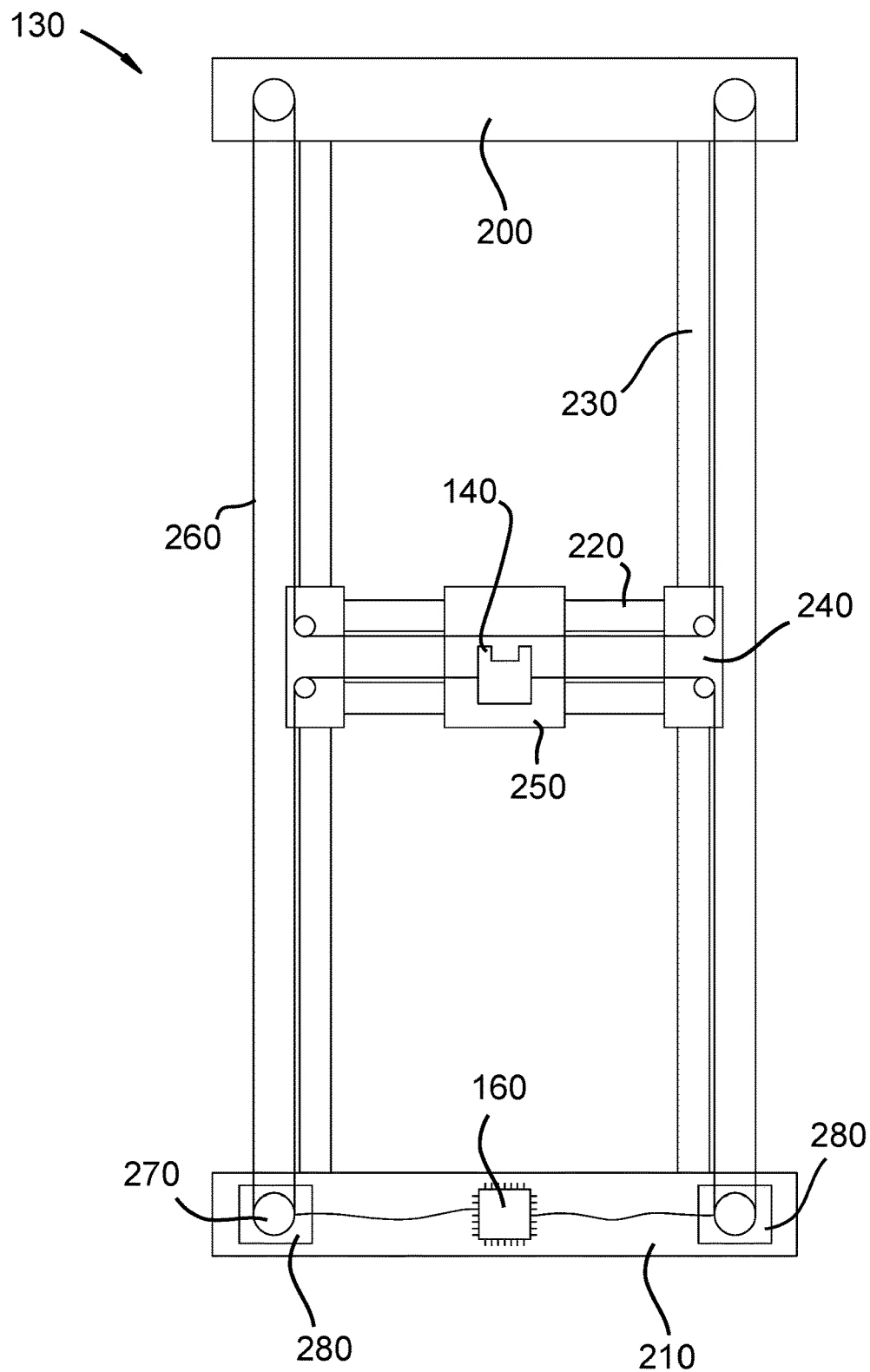
FIG. 2A depicts one embodiment of the one or more robots, in which the one or more robots move in two axes.
Figure 2B:
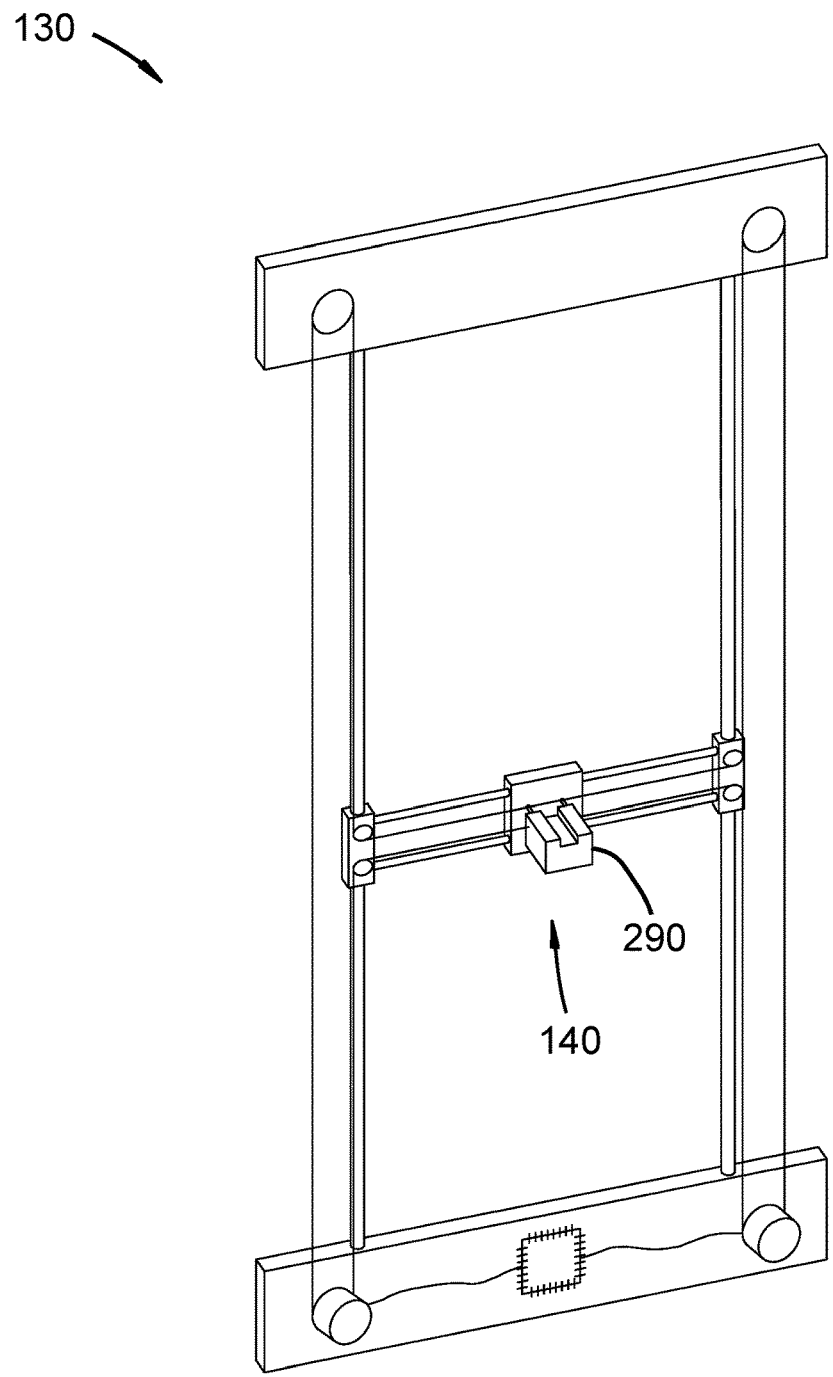
FIG. 2B depicts one embodiment of the one or more robots, in which the one or more robots move in three axes.
Figure 2C:
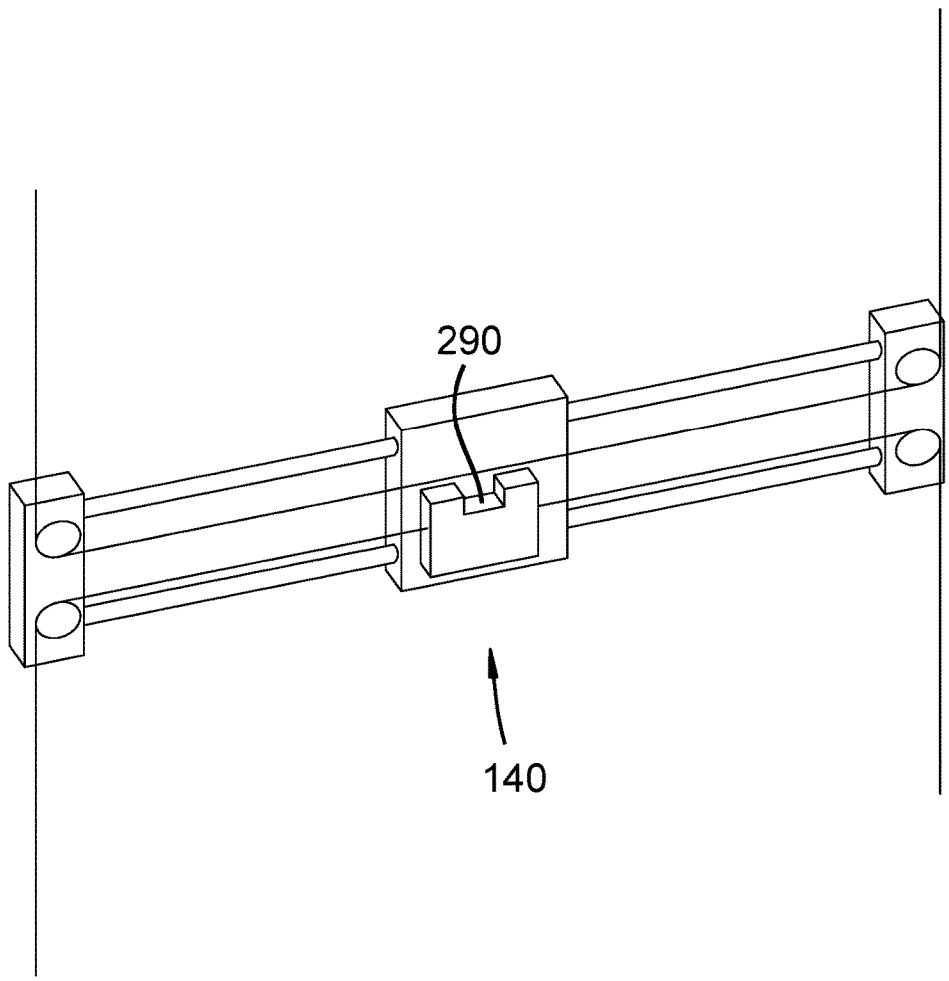
FIG. 2C depicts a close-up view of one embodiment of the one or more end effectors.

FIG. 2A-2C depict embodiments of the one or more robots 130. Each robot 130 moves in up to three axes and comprises one or more end effectors 140. FIG. 2A depicts a preferred embodiment, in which the one or more robots 130 move in two axes. In a preferred embodiment, the one or more robots 130 that move in two axes are H-bots. One advantage of an H-bot is the feature that its actuators (motors) remain stationary, which decreases the mass of the moving parts, allowing for fast movement and direction changes and low space requirements for the system. In one embodiment, the one or more robots 130 that move in two axes comprise an upper support 200, a lower support 210, horizontal tracks 220, vertical tracks 230, a vertical slide table 240, a horizontal slide table 250, an end effector 140, belts 260, pulleys 270, two electric motors 280, and a microcontroller 160. The two electric motors 280 may comprise stepper motors or servomotors. The vertical slide table 240 moves up and down vertically along the vertical tracks 230. The horizontal slide table 250 moves back and forth horizontally along the horizontal tracks 220. The end effector 140 is fixed to the horizontal slide table 250, which allows the end effector 140 to have two degrees of freedom—vertically along the vertical tracks 230 and horizontally along the horizontal tracks 220. The motors 280 drive the belts 260 through a series of pulleys 270, the belts 260 being coupled to the end effector 140. Each motor 280 is capable of applying both a positive and a reverse torque, and a combination of the torque from the two motors 280 moves the end effector 140 through the two dimensions. The microcontroller 160 provides instructions to the motors 280 as to the magnitude and direction of the torque provided. In one embodiment, a battery system powers the motors 280 in the event that there is a power outage.

FIG. 2B depicts another embodiment of the one or more robots 130, in which the one or more robots 130 move in three axes. In a preferred embodiment, the one or more robots 130 that move in three axes are H-bot-like mechanisms with one or more end effectors 140 comprising members 290 that protrude and/or contract, thereby creating a Z-axis of movement. In other embodiments, the one or more robots 130 that move in three axes are other Cartesian or Selective Compliance Assembly Robot Arm (SCARA) robots, or other models used for simple pick-and-place operations.

FIG. 2C depicts a close-up view of one embodiment of the one or more end effectors 140 of the one or more robots 130. In a preferred embodiment, the one or more end effectors 140 comprise one or more slots 290 such that the one or more end effectors 140 can mate with keys that can be attached to objects that can be lifted and moved by the one or more end effectors 140. In other embodiments, the one or more end effectors 140 are any of a variety of connecting mechanisms. In some embodiments, the one or more end effectors 140 are platforms for lifting objects from below. In some embodiments, the one or more end effectors 140 are magnetic attachments. In some embodiments, the one or more end effectors 140 have moveable parts, such as finger-like members, that can attach to objects in a manner similar to a hand grasping an item.

Figure 3:
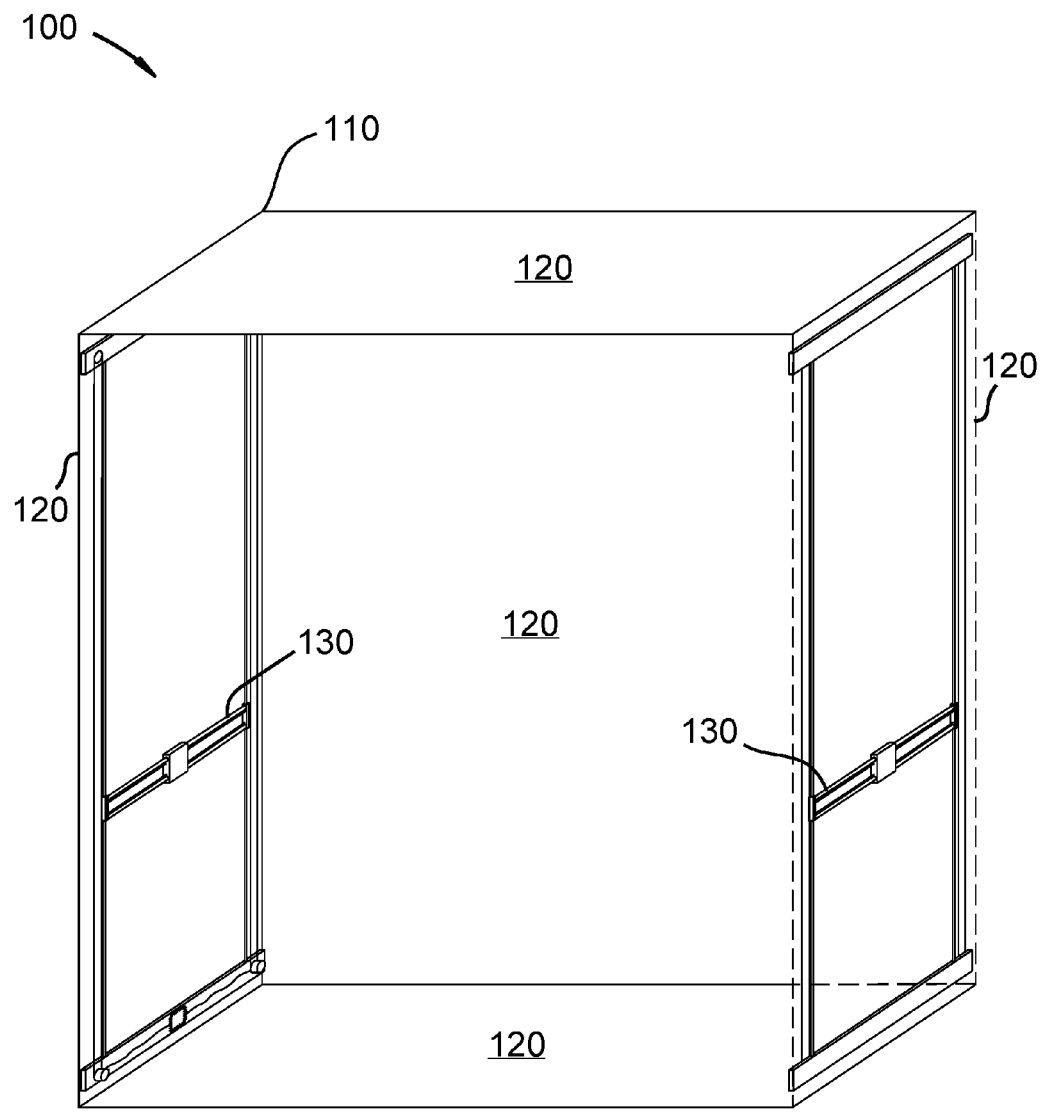
FIG. 3 depicts one embodiment of the one or more robots movably mounted to the housing.

FIG. 3 depicts one embodiment of the one or more robots 130 movably mounted to the housing 110. The housing 110 comprises one or more walls 120. In a preferred embodiment, the housing 110 comprises a rectangular prismatic configuration. In a preferred embodiment, the housing 110 comprises dimensions such that a width and depth measure approximately four feet (1.22 meters) wide and four feet (1.22 meters) deep, and a height measures approximately fourteen feet (4.27 meters) tall. In one embodiment, the in-process calibration system comprises one robot 130 movably mounted to one wall 120 of the housing 110. In another embodiment, the in-process calibration system comprises two robots 130 movably mounted to two walls 120 of the housing 110, preferably two opposite walls 120. Other embodiments comprise more than two robots 130. Some embodiments comprise the one or more robots 130 mounted against one or more walls 120, extending the entire length of the one or more walls 120. Some embodiments comprise the one or more robots 130 mounted loosely in an interior of the housing 110, not against a wall 120, but suspended from a top wall 120 (ceiling) or a bottom wall 120 (floor) of the housing 110. In embodiments comprising more than one robot 130, preferably the movements of each of the robots 130 are synchronized to mirror each other.

Figure 4A:
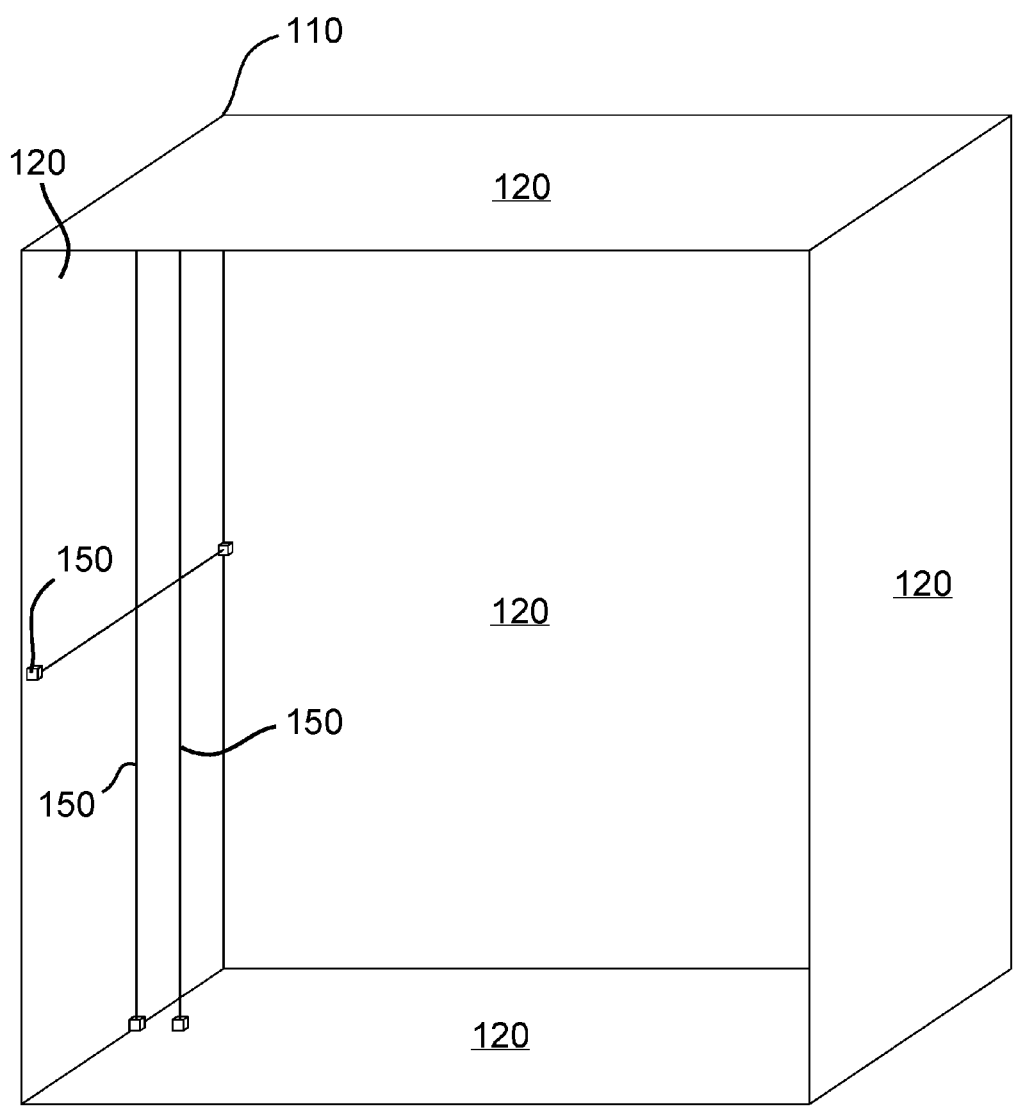
FIG. 4A depicts one embodiment of one sensor for the X-axis, one sensor for the Y-axis, and one sensor for the Z-axis of the one or more robots' movement, each sensor fixed to the housing at a known location in an axis perpendicular to the axis of the one or more robots' movement.
Figure 4B:
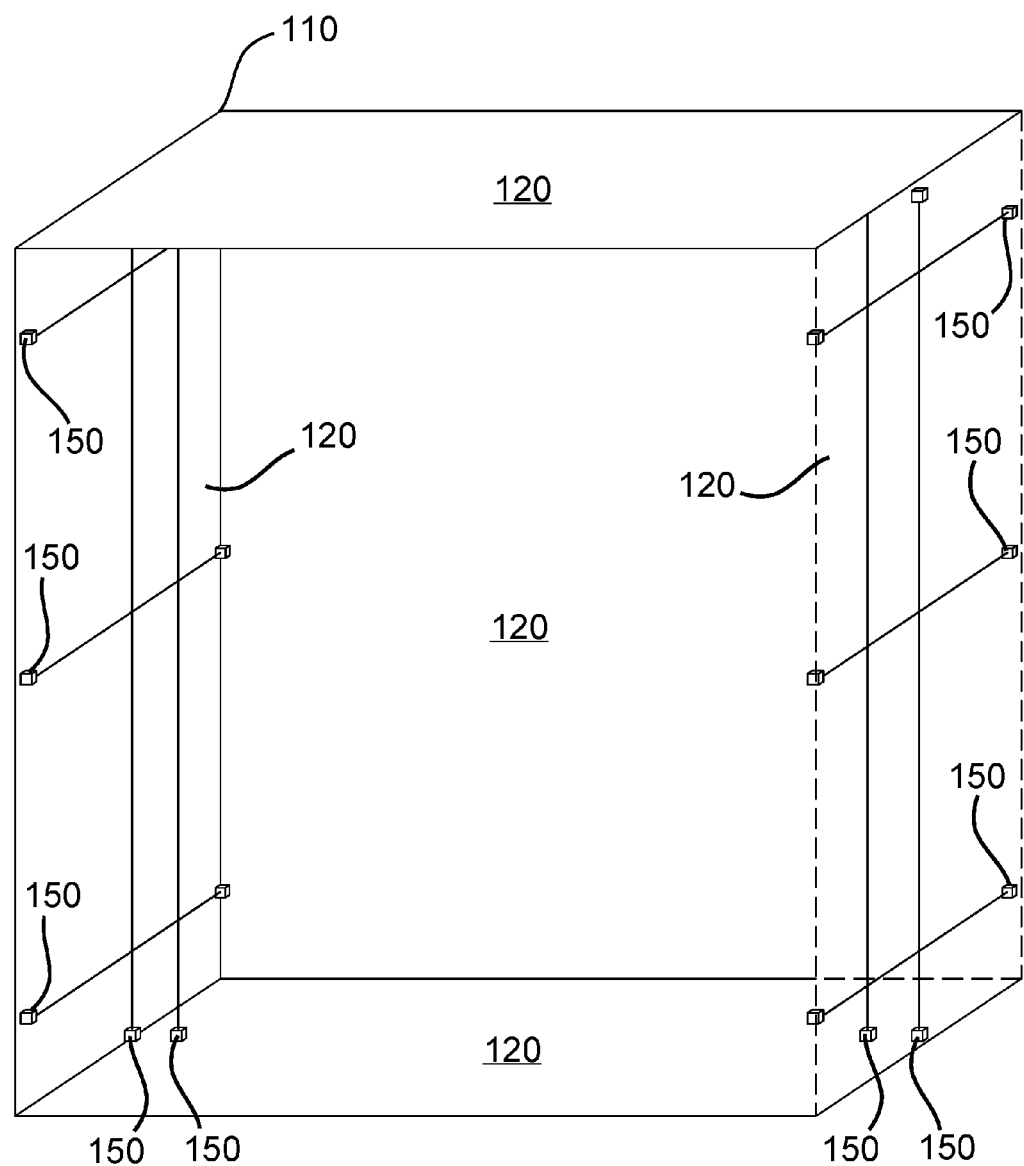
FIG. 4B depicts one embodiment of one sensor for the X-axis, one sensor for the Z-axis, and multiple sensors for the Y-axis, one sensor for the one or more robots' movement, each sensor fixed to the housing at a known location in an axis perpendicular to the axis of the one or more robots' movement.

FIG. 4A and FIG. 4B depict one embodiment of at least one sensor 150 for each of the up to three axes of the one or more robots' 130 movement, each sensor 150 fixed to the housing 110 at a known location in an axis perpendicular to the axis of the one or more robots' 130 movement. Having at least one sensor 150 for each of the up to three axes of the one or more robots' 130 movement means that if the one or more robots 130 move in the X-axis, at least one sensor 150 is needed for that axis. If the one or more robots 130 move in the X-axis and the Y-axis, at least two sensors 150 are needed, at least one sensor 150 for the X-axis and at least one sensor 150 for the Y-axis. If the one or more robots 130 move in the X-axis, the Y-axis, and the Z-axis, at least three sensors 150 are needed, at least one for each of the three axes, and so on. FIG. 4A depicts one sensor 150 for the X-axis, one sensor 150 for the Y-axis, and one sensor 150 for the Z-axis. In some embodiments, there is more than one sensor 150 for one axis of the one or more robots' 130 movement. In these embodiments, the plurality of sensors 150 for each axis are not immediately adjacent to each other, but are spaced such that the one or more end effectors 140 only intermittently trigger the sensors 150. The larger the dimensions of the housing 110 along a particular axis, the more sensors 150 there are for that axis. In a preferred embodiment, the housing 110 is taller than it is wide or deep, and therefore, there are more sensors 150 for the Y-axis than for the X-axis or the Z-axis. FIG. 4B depicts multiple sensors 150 for the Y-axis. In one embodiment, there are three sensors 150 for the Y-axis and one sensor 150 each for the X-axis and the Z-axis. Some embodiments of the in-process calibration system 100 comprise more than one robot 130. In these embodiments, there may be at least one sensor 150 for each of the up to three axes of each robot's 130 movement. FIG. 4B also depicts one embodiment comprising two robots 130, where each robot 130 has at least one sensor 150 for each of the up to three axes of the robot's 130 movement. In preferred embodiments, the sensors 150 extend the length of one of the one or more walls 120 of the housing 110, so as to function as tripwires. In one embodiment, the sensors 150 comprise photoelectric sensors. In a preferred embodiment, the sensors 150 comprise laser transmitters and receivers. In other embodiments, the sensors 150 comprise magnetic field sensors or switches. Each sensor 150 is fixed to the housing 110 at a known location in an axis perpendicular to the axis of the one or more robots' 130 movement. In other words, the at least one sensor 150 for the one or more robots' 130 movement in the X-axis is located in an axis perpendicular to the X-axis, and the same applies to the Y-axis, and the Z-axis, and so forth. In a preferred embodiment, the sensors 150 are fixed to the housing 110 immediately adjacent to the one or more robots 130, such that the one or more end effectors 140, which protrude from the one or more robots 130, share a plane with the sensors 150, and only the one or more end effectors 140 move within the plane where the sensors 150 may be triggered.

Figure 5:
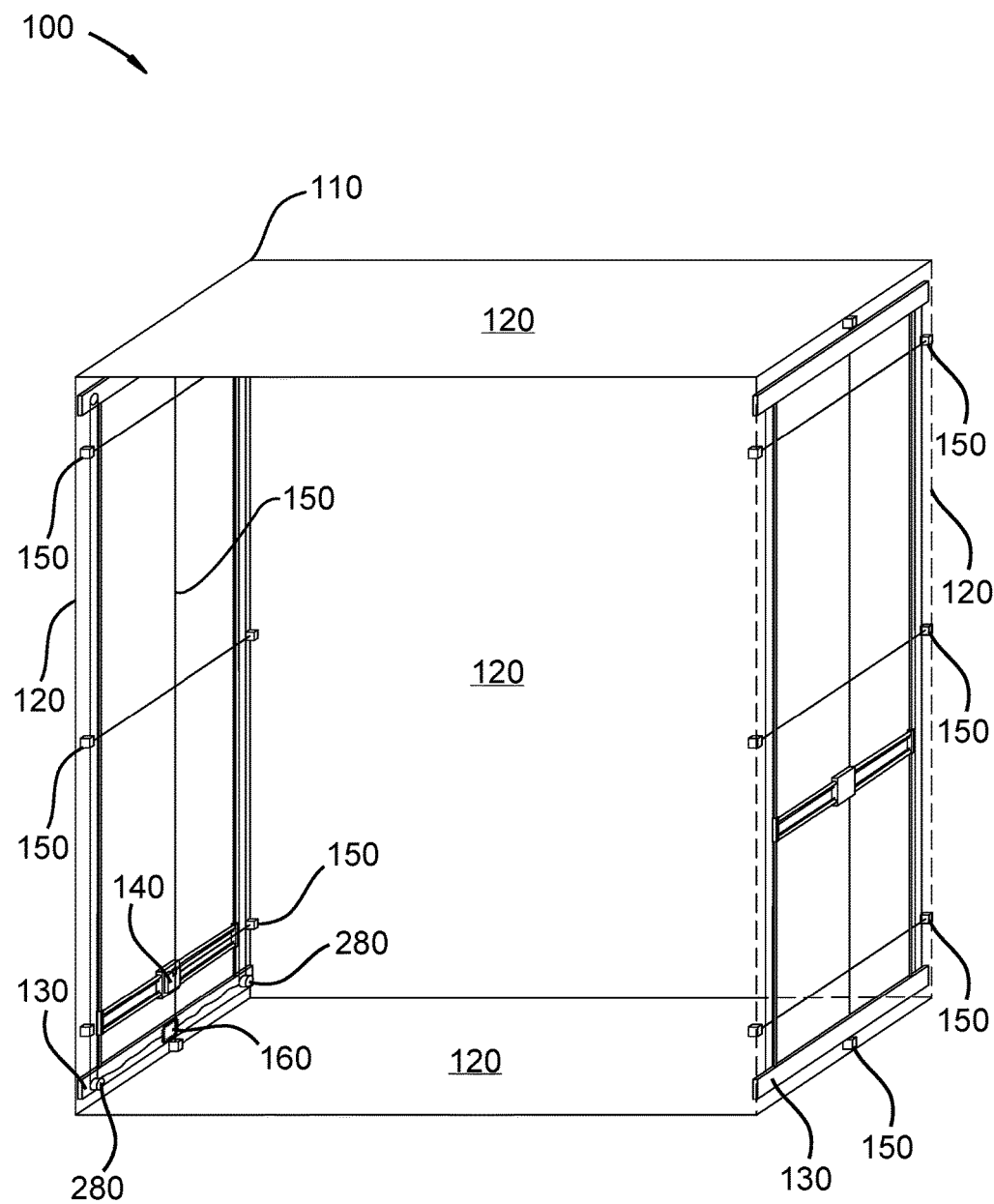
FIG. 5 depicts one embodiment of a microcontroller instructing the one or more end effectors in a sequence of moves to one or more idealized locations within the housing, whereby the one or more end effectors intermittently trigger the sensors.

FIG. 5 depicts one embodiment of a microcontroller 160 instructing the one or more end effectors 140 in a sequence of moves to one or more idealized locations within the housing 110, whereby the one or more end effectors 140 intermittently trigger the sensors 150. The microcontroller 160 plans each move to an idealized location for the one or more end effectors 140 according to two inputs: a target location and a current location. In one embodiment, the target location input is a user input, preferably received by means of a user interface. In one embodiment, the current location input is stored in memory, preferably in non-volatile memory. The microcontroller 160 computes an error between the two inputs and calculates the vector at which the one or more end effectors 140 need to move to eliminate the error. A motor 280 then moves the one or more end effectors 140 to a location that eliminates the error, the idealized location. Finally, the microcontroller 160 updates the location of the one or more end effectors 140 to the idealized location following the move. The microcontroller 160 repeats the process to create a sequence of moves to one or more idealized locations. In one embodiment, the sequence of moves is part of performing a separate high-level command, such as lifting, suspending, or repositioning an object within the housing 110. In the process of following this sequence of moves, the one or more end effectors 140 intermittently trigger the sensors 150, as depicted in FIG. 5. The sequence of moves is not fixed, and therefore, the frequency with which the one or more end effectors 140 trigger the sensors 150 is not fixed, but is completely random. In some embodiments, the sensors 150 extend the length of one of the one or more walls 120 of the housing 110, so as to function as tripwires. In one embodiment, the sensors 150 comprise photoelectric sensors. In a preferred embodiment, the sensors 150 comprise laser transmitters and receivers. In this embodiment, the one or more end effectors 140 trigger the sensors 150 when they pass through and cut off the laser beams, as depicted in FIG. 5. In one embodiment, the sensors 150 comprise magnetic field sensors. In this embodiment, the one or more end effectors 140 are fitted with magnets. The one or more end effectors 140 trigger the sensors 150 by coming into range of the magnetic field sensors with the magnets. In one embodiment, the sensors 150 are switches. In this embodiment, the one or more end effectors 140 trigger the sensors 150 by coming into contact with and flipping the switches.

Figure 6:
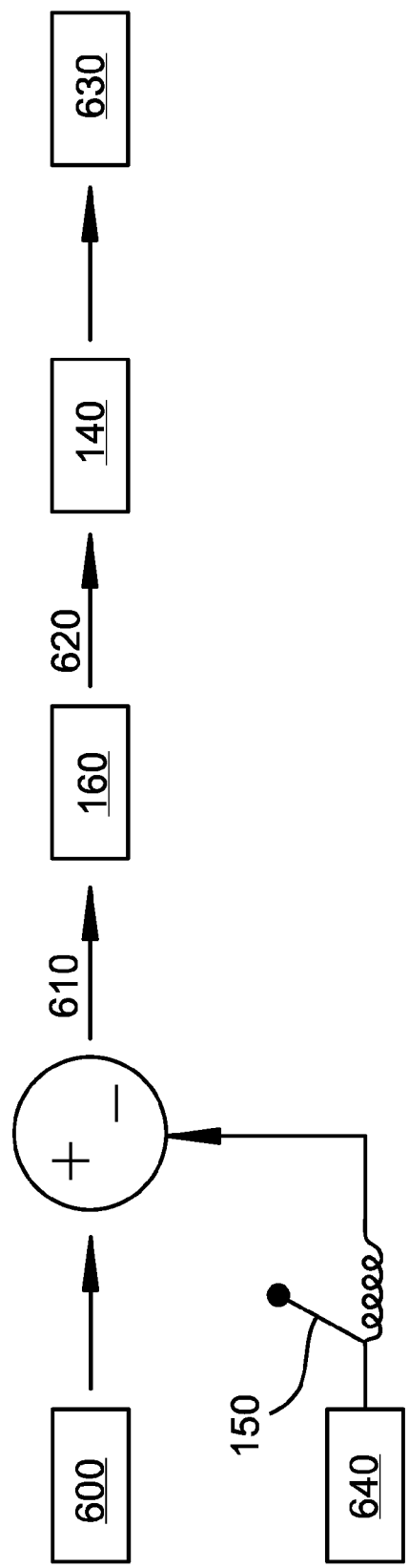
FIG. 6 depicts one embodiment of the microcontroller in communication with the sensors such that when the one or more end effectors trigger the sensors, the microcontroller corrects the idealized location of the one or more end effectors to the known location of the sensors.

FIG. 6 depicts one embodiment of the microcontroller 160 in communication with the sensors 150 such that when the one or more end effectors 140 trigger the sensors 150, the microcontroller 160 corrects the idealized location of the one or more end effectors 140 to the known location of the sensors 150. In one embodiment, the microcontroller 160 receives an input 600, a target location for the one or more end effectors 140. An error 610 is computed between the input 600 and a current location of the one or more end effectors 140. Within the microcontroller 160, a command 620 is generated to move the one or more end effectors 140 to the target location. The command 620 is sent to the one or more end effectors 140, which move according to the command 620 to the target location. After the move, the target location is stored in the microcontroller 160 as the current location. However, the current location and the target location are only idealized locations because they are theoretical constructs of the microcontroller 160. The true location of the one or more end effectors after a move is an actual location 630. Sometimes, because of the difficulty in achieving mechanical precision, the actual location 630 is not the same as the idealized location. In open loop systems, the difference between the idealized location and the actual location 630 is not corrected. In closed loop systems, feedback about the actual location 630 is continuously sent to the microcontroller 160 to correct the difference between the idealized location of the one or more end effectors 140 and the actual location 630. Closed loop systems are important for systems that require precision in multiple movements. The instant invention is a hybrid system, where feedback to correct the difference between the idealized location and the actual location 630 is sent only intermittently when the one or more end effectors 140 trigger the sensors 150. Each sensor 150 is at a known location 640. Therefore, when the one or more end effectors 140 trigger the sensors 150, information is sent to the microcontroller 160 to correct the idealized location to the known location 640 of the sensors 150. In this way, the system recalibrates, and thereby can perform multiple movements that require precision and accuracy without breaking down.

Figure 7:
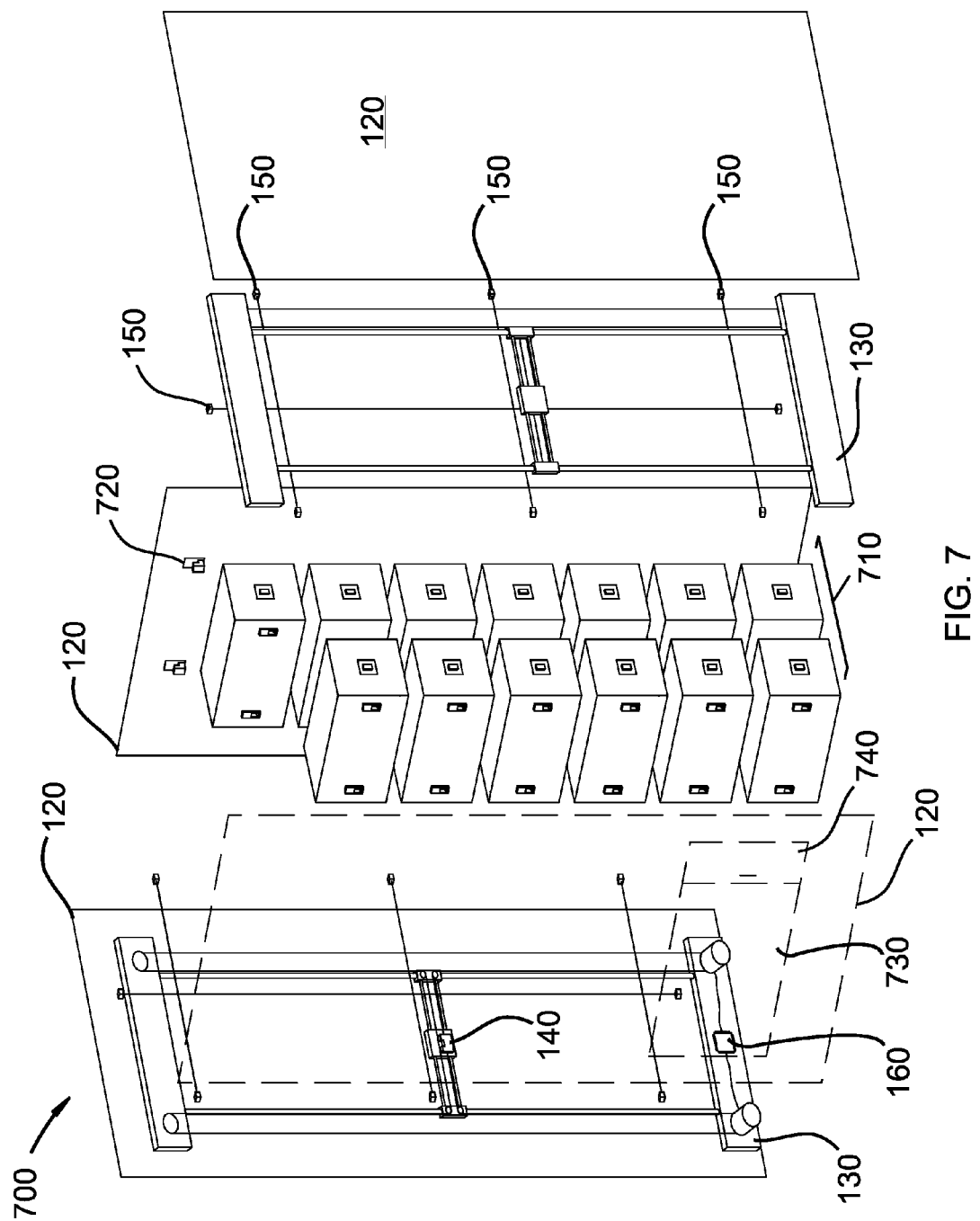
FIG. 7 depicts an exploded view of one embodiment of the in-process calibration system as a component of an automated storage and retrieval system.

FIG. 7 depicts an exploded view of one embodiment of the in-process calibration system 100 as a component of an automated storage and retrieval system 700. In one embodiment, the automated storage and retrieval system 700 is a non-revolving automated storage and retrieval system. In a non-revolving automated storage and retrieval system, a target object moves directly to a target access position. In some embodiments, the non-revolving automated storage and retrieval system is that which is described in Automatic Storage and Retrieval System with Planar Motion Mechanism, patent specification No. U.S. Ser. No. 15/248,589; Automated Storage and Retrieval Direct Movement Method, patent specification No. U.S. Ser. No. 15/260,979; or Automated Storage and Retrieval System with Retractable Mountings, patent specification No. U.S. Ser. No. 15/278, 545, which are commonly owned by the Applicant and incorporated by reference for all that they teach. In one embodiment, the automated storage system 700 is a revolving automated storage and retrieval system.

In one embodiment, the automated storage and retrieval system 700 comprises one or more positionable objects 710 that are repositioned within the automated storage and retrieval system 700 by means of the one or more robots 130. In one embodiment, the one or more positionable objects 710 are storage bins. In other embodiments, the one or more positionable objects 710 are one or more appliances, preferably appliances as described in Modular Domestic Appliance with Electrically Conductive Members, patent specification Ser. No. 15/286,877, which is commonly owned by the Applicant and incorporated by reference for all that it teaches. In one embodiment, each appliance is selected from the group consisting of microwaves, refrigerators, ice machines, heaters, toasters, mixers, ovens, juicers, dryers, grinders, dispensers, freezers, gas and electric cook tops, gas and electric ranges, bread machines, humidifiers, and grills. In one embodiment, the automated storage and retrieval system 700 comprises further comprises one or more connectors 720 mounted to the one or more walls 120 of the housing 110. In one embodiment, the one or more connectors 720 in the automated storage and retrieval system 700 are electrically conductive wall hooks. In one embodiment, the electrically conductive wall hooks are those which are described in patent specification No. U.S. Ser. No. 15/277, 090, Electrically Conductive Wall Hooks, which is commonly owned by the Applicant and incorporated by reference for all that it teaches. In one embodiment, the one or more positionable objects 710 are suspended from the one or more connectors 720. In one embodiment, the one or more robots 130 suspend the one or more positionable objects 710 from the one or more connectors 720, repositioning the one or more positionable objects 710 within the housing 110 until a desired positionable object reaches one or more access ports 730, where it can be accessed and utilized. The one or more end effectors 140 of the one or more robots 130 removably attach to the one or more positionable objects 710, preferably be means of keys attached to the one or more positionable objects 710, and the microcontroller 160 directs the movement of the one or more end effectors 160. Each access port 730 comprises a window that provides access to the interior of the housing 110 and to the automated storage and retrieval system 700 inside. In one embodiment, each access port 730 comprises a removable covering 740, the removable covering 740 comprising one of a group consisting of a flap that opens from the top or the bottom, a sliding panel, a curtain, or a blind. In one embodiment, the removable covering 740 is mechanically driven. In one embodiment, the microcontroller 160 stores location data for each of the one or more positionable objects 710 and instructs the one or more robots 130 to reposition the one or more positionable objects 710 based on the location data in response to a request by a user. In some embodiments, a user makes requests by means of a user interface, which may be voice controlled, and which may allow customized inputs.

Figure 8:
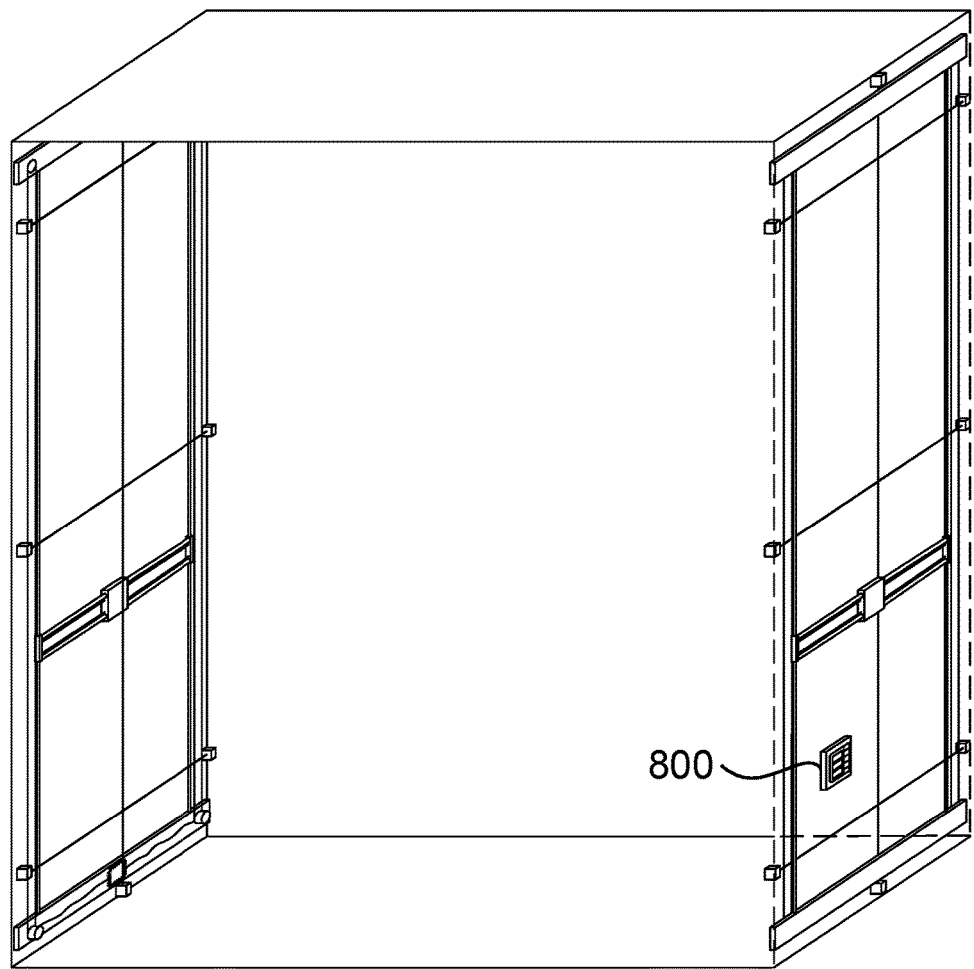
FIG. 8 depicts one embodiment of an in-process calibration system comprising a user interface.

FIG. 8 depicts one embodiment of the in-process calibration system 100 comprising a user interface 800. In a preferred embodiment, the user interface 800 comprises a voice control user interface. In other embodiments, the user interface 800 comprises buttons or a touch-sensitive display on a mobile device. In one embodiment, a user communicates to the microcontroller 160 a desired sequence of moves for the one or more end effectors 140 to one or more idealized locations within the housing 110.

The invention claimed is:

1. An in-process calibration system comprising:
   a housing comprising one or more walls;
   one or more robots movably mounted to the housing, each robot moving in up to three axes and comprising one or more end effectors, wherein the one or more robots are H-bots;
   at least one sensor for each of the up to three axes of the one or more robots' movement, each sensor fixed to the housing at a known location in an axis perpendicular to the axis of the one or more robots' movement;
   a microcontroller that instructs the one or more end effectors in a sequence of moves to one or more idealized locations within the housing, whereby the one or more end effectors intermittently trigger the sensors, and the microcontroller in communication with the sensors such that when the one or more end effectors trigger the sensors, the microcontroller corrects the idealized location of the one or more end effectors to the known location of the sensors.

2. The in-process calibration system of claim 1, wherein the sensors comprise photoelectric sensors.

3. The in-process calibration system of claim 1, wherein the sensors comprise laser transmitters and receivers.

4. The in-process calibration system of claim 1, wherein the sensors comprise magnetic field sensors or switches.

5. The in-process calibration system of claim 1, wherein the one or more robots are move in three axes.

6. The in-process calibration system of claim 1, wherein the in-process calibration system is a component of an automated storage and retrieval system.

7. The in-process calibration system of claim 6, wherein the automated storage and retrieval system comprises one or more positionable objects that are repositioned within the automated storage and retrieval system by means of the one or more robots.

8. The in-process calibration system of claim 7, wherein the one or more positionable objects are one or more appliances.

9. The in-process calibration system of claim 7, wherein the one or more positionable objects are storage bins.

10. The in-process calibration system of claim 6, wherein the automated storage and retrieval system is a non-revolving automated storage and retrieval system.

11. The in-process calibration system of claim 6, wherein the automated storage and retrieval system comprises electrically conductive wall hooks.

12. The in-process calibration system of claim 1, further comprising a user interface.

13. The in-process calibration system of claim 12, the user interface comprising a voice control user interface.

14. The in-process calibration system of claim 1, wherein the sequence of moves is part of performing a separate high-level commands.

15. The in process calibration system of claim 14, wherein the high-level command is one of lifting, suspending and repositioning an object within the housing.

* * * * *